US00RE47230E

(19) United States
(12) Reissued Patent
Arnold

(10) Patent Number: US RE47,230 E
(45) Date of Reissued Patent: Feb. 12, 2019

(54) VISOR ASSEMBLY

(76) Inventor: Derek Leslie Arnold, Emmeloord (NL)

(21) Appl. No.: 13/465,389

(22) Filed: May 7, 2012

Related U.S. Patent Documents

Reissue of:

(64) Patent No.: 6,922,850
Issued: Aug. 2, 2005
Appl. No.: 10/049,990
PCT Filed: Aug. 24, 2000
PCT No.: PCT/NL00/00589
§ 371 (c)(1),
(2), (4) Date: Apr. 15, 2002
PCT Pub. No.: WO01/13750
PCT Pub. Date: Mar. 1, 2001

U.S. Applications:

(62) Division of application No. 11/888,885, filed on Aug. 2, 2007, now Pat. No. Re. 44,250, which is an application for the reissue of Pat. No. 6,922,850.

(30) Foreign Application Priority Data

Aug. 24, 1999 (NL) ..... 1012896

(51) Int. Cl.
*A42B 3/18* (2006.01)
*A42B 3/24* (2006.01)
*A42B 3/22* (2006.01)

(52) U.S. Cl.
CPC ..... *A42B 3/226* (2013.01); *A42B 3/24* (2013.01)

(58) Field of Classification Search
CPC .. A42B 3/24; A42B 3/226; A42B 3/22; A42B 3/221; A42B 3/222; A42B 3/18; A42B 3/185
(Continued)

(56) References Cited

U.S. PATENT DOCUMENTS 2,952,853 A * 9/1960 Benzel ..... A41D 13/11 128/206.23
3,012,248 A 12/1961 Kleinman
(Continued)

FOREIGN PATENT DOCUMENTS

DE 3229021 A1 2/1984
DE 3237316 A1 4/1984
(Continued)

OTHER PUBLICATIONS

English Language Translation of FR 2675348 taken from EPO on Mar. 24, 2014 including abstract, description, claims and drawings.*

(Continued)

*Primary Examiner* — Patricia L Engle
(74) *Attorney, Agent, or Firm* — Ramin Amirsehhi LL/M; Philip Tsai

(57) ABSTRACT

Visor assembly [(1, 21) consisting of] *having* an inner shield [(6, 26)] and an outer shield [(2, 22)]. In the use position these shields are some distance apart. With this arrangement the inner shield [(6, 26)] is located within the peripheral confines of the outer shield [(2, 22)]. The inner shield [(6, 26)] is provided with an elevation [(7, 27)] which extends close to the periphery thereof and which acts as a spacer with respect to the outer shield. This elevation [(7, 27)] is preferably made of silicone material which is snack to the inner shield [(6, 26)] but is not stuck to the outer shield [(2,
(Continued)

22)]. Fixing to the outer shield [(2, 22)] takes place [by means (10, 12) of] *via* mechanical fixing [means].

40 Claims, 2 Drawing Sheets

(58) Field of Classification Search
USPC ..... 2/6.1–6.5, 424–425, 15, 426, 434, 9
See application file for complete search history.

(56) References Cited

U.S. PATENT DOCUMENTS 3,718,937 A 3/1973 Smith
3,805,294 A * 4/1974 Rose ..... A42B 3/225 2/10
3,880,157 A * 4/1975 Elifritz ..... 128/201.27
4,028,739 A * 6/1977 Bell et al. ..... 2/6.3
4,047,249 A * 9/1977 Booth ..... 2/424 X
4,101,980 A 7/1978 Stepan et al.
4,138,746 A 2/1979 Bergmann
4,584,721 A 4/1986 Yamamoto
5,067,174 A * 11/1991 Ritchey et al. ..... 2/10
5,131,101 A 7/1992 Chin
5,405,373 A 4/1995 Petersson et al.
5,475,878 A * 12/1995 Dawn et al. ..... 2/411
5,500,953 A 3/1996 Reuber et al.
5,671,483 A 9/1997 Reuber
5,694,650 A 12/1997 Hong
5,753,373 A * 5/1998 Scholz et al. ..... 2/9 X
5,765,235 A * 6/1998 Arnold ..... 2/424
5,802,622 A * 9/1998 Baharad et al. ..... 2/434
6,102,033 A * 8/2000 Baribeau ..... A42B 3/288 128/201.15
6,161,225 A * 12/2000 Arai ..... A42B 3/226 2/424
6,405,373 B1 * 6/2002 Grau ..... 2/15

FOREIGN PATENT DOCUMENTS

DE 3244152 5/1984
DE 3244152 A1 5/1984
DE 3323419 A1 1/1985
DE 3635703 4/1988
DE 3635703 A1 4/1988
EP 0504518 9/1992
EP 0504518 A1 9/1992
EP 0784942 7/1997
EP 0784942 A1 7/1997
FR 2675348 * 4/1991
FR 2675348 10/1992
GB 2052244 A 1/1981
JP H02-221403 A 9/1990
JP 2948573 B1 9/1999
WO 96/16563 6/1996

OTHER PUBLICATIONS

Office Action in Japanese counterpart, application No. 2014-182636, dated Nov. 24, 2015.

* cited by examiner

VISOR ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 6,922,850. The reissue applications are application Ser. No. 11/888,885 (which issued as RE44,250) and Ser. No. 13/465,389 (the present divisional reissue application).*

*This application is a divisional reissue application of a parent reissue application, which parent reissue application is U.S. application Ser. No. 11/888,885, filed on Aug. 2, 2007, the entire contents of which are incorporated by reference herein.*

The present invention relates to a visor assembly comprising an outer shield and an inner shield spaced therefrom, which inner shield is located within the periphery of the outer shield, a seal/spacer extending around the periphery of said inner shield being fitted between the outer shield and inner shield.

An assembly of this type is disclosed in DE 3 244 152 A1. This publication describes a safety visor assembly consisting of an outer shield and an inner shield. The inner shield is hingeably attached to a helmet construction. These shields are held apart by a rubber ring which is fitted in a seat in one of the shields. The parts are then fixed to one another with the aid of a moulding material. The space between inner shield and outer shield can optionally be filled with a plastic composition in order to increase the strength thereof. Strength is of primary importance for such helmets.

A mechanical construction for holding an inner shield and an outer shield apart is disclosed in PCT Application 9616563 in the name of Derek's Patent B. V. With this structure the outer shield is provided with means for fixing to a helmet or the like. The aim of such a structure is to prevent the visor misting up. With this structure the distance between inner shield and outer shield is guaranteed only in a single location and in principle air containing moisture, water and dirt is able freely to move between inner shield and outer shield. Consequently it is not possible to prevent misting up of the inner shield in an optimum manner under all conditions.

However, if the structure according to DE 3 244 152 A1 were to be used, there would be the disadvantage that both the inner shield and the outer shield would have to be removed in the event of damage.

Such structures with permanent fixing between inner shield and outer shield are also disclosed in U.S. Pat. No. 3,718,937 and EP 0 504 518 A.

The aim of the present invention is to avoid the disadvantages associated with the prior art. That is to say, the aim is to provide a chamber between inner shield and outer shield that can be filled with air or a gas and as far as possible is sealed with respect to the environment. Moreover, the width of such a chamber, that is to say the internal spacing between inner shield and outer shield, must be optimized in order as far as possible to prevent misting up. Furthermore, it must be simple to replace the various components independently of one another. The shapes of the shields must also follow one another as far as possible, that is to say the shields must lie against one another in the correct manner.

These aims are achieved with a visor assembly described above in that the seal/spacer is stuck to the inner shield and is fitted detachably against said outer shield and in that mechanical fixing means are arranged between the two shields for fixing the latter with respect to one another, said outer shield being provided with means for fixing to a further component, such as a helmet or goggles frame.

According to the invention a visor assembly is understood to comprise any possible application. One important application is that in combination with helmets or other headwear. A further application is that of goggles-like constructions. However, windows in vehicles and instrument covers exposed to the open air, and the like, can also make use of the technology according to the invention. A particular application of the invention lies in helmets, goggles and the like which are used at low temperature. In snowmobiles, for example, there is the problem that moisture exhaled by the driver and/or passengers deposits as ice on the visor as a result of direct heat transfer with the environment. Surprisingly, it has been found that this problem no longer exists with the construction according to the invention.

As can be seen from the above, the spacer is stuck to the inner shield only. Fixing of the inner shield to the outer shield takes place with the aid of mechanical means. Consequently it is possible to release the connection between the inner shield and the outer shield at any desired point in time. This can be the case if, for example, the outer shield has been damaged. Moreover, this can be necessary if the inside of the outer shield or the outside of the inner shield becomes damp or soiled for any reason whatsoever.

According to an advantageous embodiment of the invention, the mechanical fixing means comprise pins fitted on the outer shield which interact with recesses made in the inner shield. Such mechanical fixing means are known in the state of the art for use of a visor assembly with which the inner shield and outer shield are positioned against one another. Such a construction is described in European Patent Application 95937212.9 in the name of Derek's Patent B. V.

In the case of the present invention there is a gap between the inner shield and outer shield.

The pins and recesses interacting therewith, which have been described above, can be further developed depending on the application. For instance, the pins can comprise eccentric pins, as a result of which a closer fit to the position of the recesses can be obtained. Furthermore, the recesses must be made in attachments, which attachments, in turn, are fitted to the inner shield. If the attachments comprise a resilient construction, any differences in tolerance between pins and recesses which arise either during production or during use can be compensated for.

According to an advantageous embodiment of the invention the sea/spacer is made of silicone material. This acts as a flexible seal between the inner shield and outer shield. Moreover, the compressive strain between the two shields is uniformly distributed. Preferably the silicone material is dry, set and flexible silicone material. The ingress of moisture and the like between the two shields is prevented as far as possible by means of such a construction. Because the spacer is not stuck to the outer shield, some movement relative thereto is possible. This is of importance if the inner shield and outer shield are made of different materials. One example of this is if the outer shield is made of polycarbonate and the inner shield of cellulose acetate. Differences in expansion can be overcome without any problem with the aid of a rubbery elastic sea. If cellulose acetate or other plastics are used it can be important to subject these to a heat treatment in advance. The mechanical properties can be improved by this means. This relates to the material having the same properties in all directions and to restriction of shrinkage when the material is subsequently subjected to high temperature. Cellulose acetate, for example, can be subjected to a heat treatment at approximately 25-80° C. for approximately two hours for this purpose.

According to an advantageous embodiment of the invention, the inner shield is made of cellulose propionate. The light transmission of the latter is appreciably better than that of cellulose acetate. The inner shield can acquire improved hydrophilic properties by applying a silicone-based coating thereto, by means of which misting up is counteracted. It is possible to provide the other side with a hard, scratch-resistant coating. By making the inner shield removable with respect to the outer shield it is possible to use such an inner shield in two positions, a first, winter position in which the coating on the inner shield which counteracts misting up faces towards the face of the user and a second, summer position in which the inner shield is fitted precisely the other way round. Of course, in such an embodiment the inner shield will be provided with a rim of flexible material on both sides.

It must be understood that the use of cellulose propionate as described above for an inner shield is not restricted to combination with the technique for fixing to an outer shield. That is to say, any combination of an inner shield made of cellulose propionate material with an outer shield fixed to one another in any manner whatsoever and with or without the provision of a mutual seal falls within the scope of the present invention.

The distance between the inner shield and outer shield can be adjusted as desired and is preferably greater than 2 mm and more particularly approximately 3 mm. Apart from the tact that the insulation between inner shield and outer shield is optimised by this means, it is also possible in this way to achieve an optimum seal between inner shield and outer shield. It will be understood that sealing between inner shield and outer shield is appreciably more difficult than in the case of constructions which have a permanent closure.

According to a further advantageous embodiment of the invention the outer shield is provided with a recess. The dimensions of this recess at least correspond to the peripheral dimensions of the inner shield. The inner shield can be fitted in such a recess. The mechanical fixing means can be a snap-fit rim or the like in this case. Other constructions for fixing the inner shield in the seat can easily be envisaged by those skilled in the art and fall within the scope of the present invention.

The invention will be explained in more detail below with reference to illustrative embodiments shown in the drawing, In the drawing.

Figure 1:
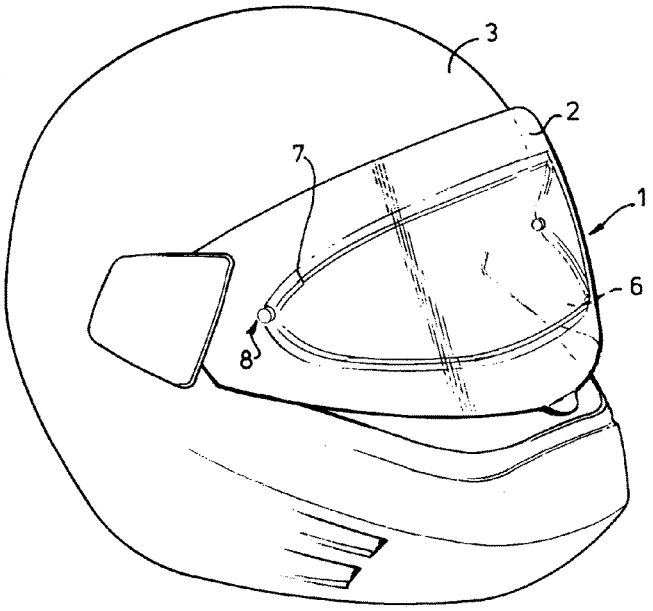
FIG. 1 shows a helmet provided with a first embodiment of the visor assembly according to the invention.
Figure 2:
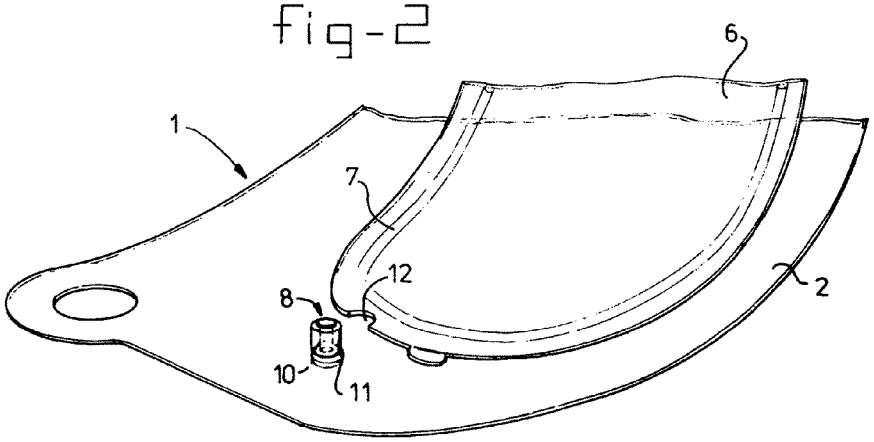
FIG. 2 shows a perspective view of a detail of the visor assembly according to FIG. 1.

In FIG. 1 the visor assembly according to the invention is indicated in its entirety by 1. An outer visor can be seen, which is hingeably joined to a helmet 3 in a manner not shown in more detail. As can be seen from FIG. 2, the visor assembly 1 consists of an inner shield 6 in addition to the outer shield 2. Inner shield 6 can be secured within the outer shield 2 with the aid of recesses 12 and pins 10 which are fitted in the outer shield 2 and together form retaining means 8. Such a construction is described in more detail in European Application 95937212.9.

According to the invention the inner shield 6 is now provided with a peripheral rim 7 of silicone material. This bead material is stuck to the inner shield but is applied to outer shield 2 only after it has set, that is to say after the silicone material 7 no longer has any adhesive properties. As a result of the presence of this bead 7 the inner shield 6 is held some distance away from the outer shield 2. Moreover, complete sealing between inner shield 6 and outer shield 2 takes place.

Should it be necessary for any reason whatsoever to take inner shield 6 and outer shield 2 apart this is then possible in a simple manner because no permanent adhesive joint has been produced with the aid of the ring of silicone material 7.

Figure 3:
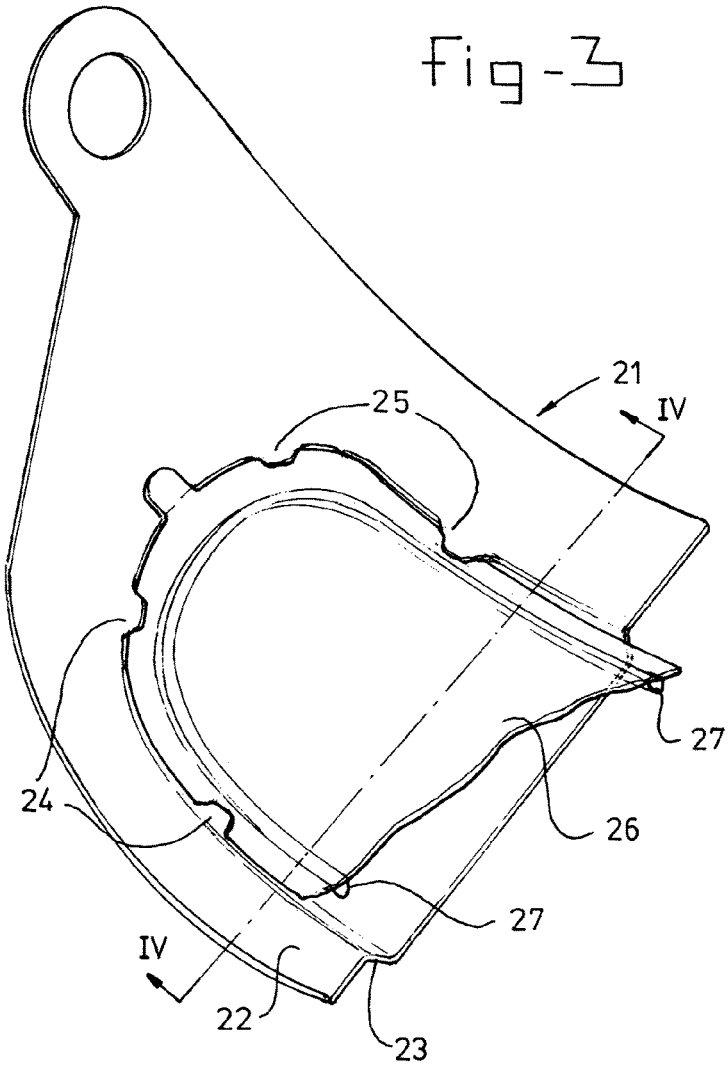
FIG. 3 shows a perspective view of a second embodiment of the visor assembly according to the invention.
Figure 4:
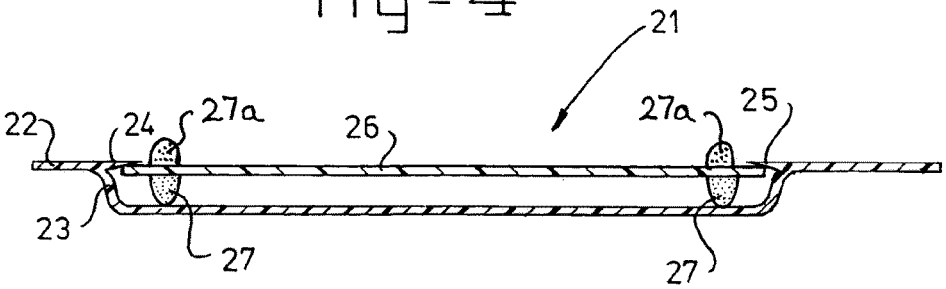
FIG. 4 shows a section along the line IV-IV in FIG. 3.

Any other mechanical fixing constructions known in the prior art can be used instead of the fixing means 8 shown. In FIGS. 3 and 4 a variant of the visor assembly according to the invention is shown and is indicated in its entirety by 21. In this case it is not indicated on what this visor is fitted.

As can be seen, a recess or seat 23 has been made in the outer shield 22. The dimensions of this recess or seat correspond to the external dimensions of the inner shield 26. As in the case of the previous embodiment, inner shield 26 is provided close to the periphery thereof with a rim or ring 27 extending all round. This rim or ring is made of a flexible sealing material. Optionally, a second rim 27a of flexible material can be provided on the other side of inner shield 26 so that the inner shield can be reversed in position. Fixing of inner shield 26 to outer shield 22 takes place with the aid of a simple snap-fit construction. Snap-in lips 24 and 25 are arranged at, respectively, the top and bottom in the outer shield 22. By this means the inner shield 26 can be pushed against the outer shield 22 under some pretension. Spacer 27 provides a seal between inner shield and outer shield, as a result of which ingress of moisture, and consequently misting up of the outer shield 22, can be prevented.

It must be understood that the construction with which the inner shield is somewhat sunken in the outer shield can also be implemented in another way. For instance, it is possible to construct the outer shield with an appreciable thickness, for example 3 mm, close to the periphery. By making a recess, for example 1 mm deep, in this thickness, the inner shield can be accommodated therein. That is to say the outer shield has a lesser thickness at the location of the inner shield. With this arrangement it is possible for a recess made in this way in the outer shield to be delimited on all sides by thicker material of the outer shield. However, it is also possible to allow the lesser thickness of the outer shield to extend over the entire length thereof in a certain direction. The inner shield can be moved relative to the outer shield in that direction and brought into position.

On comparison of the above illustrative embodiments, further variant embodiments will immediately become apparent to those skilled in the art. These are obvious in the light of the above description and full within the scope of the appended claims.

What is claimed is:

[1. Visor assembly comprising (a) a replaceable inner shield;

(b) an outer shield spaced from the inner shield and carrying mechanical fixing elements to fix the inner shield to the outer shield, the inner shield being supported by the outer shield, being located within the periphery of the outer shield, being spaced from and engageable with the outer shield and being detachable from the outer shield and visor assembly;

(c) additional fixing elements for fixing the outer shield to a support component, the support component optionally being a helmet or a goggles frame; and (d) a sealing and spacing member extending around the periphery of the inner shield, on a surface facing the outer shield, to seal and space the inner shield from the outer shield;

wherein the sealing and spacing member is fabricated of flexible silicone material, is adhered to the inner shield and can sealingly engage the outer shield without adhering to the outer shield.]

[2. Visor assembly according to claim 1, wherein the sealing and spacing member comprises a ring and an enclosed gas or air chamber is delimited between the inner shield and the outer shield by the sealing and spacing member and wherein the internal width of said chamber is at least 2 mm.]

[3. Visor according to claim 1, wherein said mechanical fixing elements comprise pins fitted on the outer shield and recesses in the inner shield the pins being cooperative with the recesses.]

[4. Visor assembly according to claim 1, wherein said outer shield is made of polycarbonate.]

[5. Visor assembly according to claim 1, wherein said inner shield is made of heat-treated cellulose acetate material.]

[6. Visor assembly according to claim 1, wherein said mechanical fixing elements comprise a seat in said outer shield the seat at least partially corresponding to the shape of said inner shield.]

[7. Visor assembly according to claim 1, wherein said inner shield is made of cellulose propionate material.]

[8. Visor assembly according to claim 1, wherein said inner shield is provided on one side with a coating that counteracts misting.]

[9. Visor assembly according to claim 7, wherein said inner shield is provided on one side with a scratch-resistant coating.]

[10. A visor assembly according to claim 1 wherein the visor assembly lacks electric heating means.]

[11. A visor assembly according to claim 1 wherein the outer shield has a recess corresponding to the external dimensions of the inner shield and wherein the inner shield is accommodated in the outer shield recess.]

[12. A visor assembly according to claim 1 wherein the inner shield has a mist-resistant coating on the one surface and comprises a second peripheral resilient sealing and spacing member adhered to the other surface and wherein the inner shield is reversible to dispose the mist-resistant coating either inwardly or outwardly of the space between the inner and the outer shield.]

[13. A visor assembly according to claim 2 wherein said mechanical fixing elements comprise pins fitted on the outer shield and recesses in the inner shield the pins being cooperative with the recesses and wherein said mechanical fixing elements comprise a seat in said outer shield the seat at least partially corresponding to the shape of said inner shield.]

[14. A visor assembly according to claim 13 wherein the outer shield has a recess corresponding to the external dimensions of the inner shield and wherein the inner shield is accommodated in the outer shield recess.]

[15. A visor assembly according to claim 2 wherein said outer shield is made of polycarbonate, said inner shield is made of heat-treated cellulose acetate material or cellulose propionate material and optionally said inner shield is provided on one side with a coating that counteracts misting.]

[16. A visor assembly according to claim 13 wherein said outer shield is made of polycarbonate, said inner shield is made of heat-treated cellulose acetate material or cellulose propionate material and optionally said inner shield is provided on one side with a coating that counteracts misting.]

[17. Visor assembly comprising (a) a replaceable inner shield;

(b) an outer shield spaced from the inner shield and carrying mechanical fixing elements to fix the inner shield to the outer shield, the inner shield being supported by the outer shield, being located within the periphery of the outer shield and being spaced from and engageable with the outer shield and being detachable from the outer shield and visor assembly;

(c) additional fixing elements for fixing the outer shield to a support component, the support component optionally being a helmet or a goggles frame; and (d) a sealing and spacing member extending around the periphery of the inner shield, on a surface facing the outer shield, to seal and space the inner shield from the outer shield; wherein the sealing and spacing member is flexible and is adhered to the inner shield and can sealingly engage the outer shield without adhering to the outer shield and wherein the visor assembly lacks electric heating means.]

[18. A visor assembly according to claim 17 wherein the sealing and spacing member of flexible material comprises a ring, optionally of rubbery elastic material, and an enclosed gas or air chamber is delimited between the inner shield and the outer shield by the sealing and spacing member and wherein the internal width of said chamber is at least 2 mm., said mechanical fixing elements comprise pins fitted on the outer shield and recesses in the inner shield the pins being cooperative with the recesses and wherein said mechanical fixing elements comprise a seat in said outer shield the seat at least partially corresponding to the shape of said inner shield.]

[19. A visor assembly according to claim 18 wherein said outer shield is made of polycarbonate, said inner shield is made of heat-treated cellulose acetate material or cellulose propionate material and optionally said inner shield is provided on one side with a coating that counteracts misting.]

[20. Visor assembly according to claim 1 wherein the inner shield is directly connected to the outer shield by the mechanical fixing elements and is supported entirely by the outer shield.]

*21. Visor assembly comprising:*

*an outer shield;*

*a replaceable inner shield spaced from the outer shield and located within the periphery of the outer shield;*

*a recess in the outer shield, the dimensions of which at least correspond to the peripheral dimensions of the inner shield such that the inner shield can be fitted therein;*

*mechanical fixing elements for detachably fixing the inner shield to the outer shield;*

*elements for fixing the outer shield to a further component,*

*a spacer extending around the periphery of said inner shield, said spacer being adhered to the inner shield and fitted detachably against said outer shield,*

*wherein the inner shield is detachable from the outer shield and visor assembly; and*

*a sealed gas/air chamber between the inner shield and the outer shield.*

*22. Visor assembly according to claim 21, wherein the spacer acts as a sealing member to provide the sealed gas/air chamber between the inner shield and the outer shield.*

*23. Visor assembly according to claim 22, wherein said spacer is a rubbery elastic seal.*

*24. Visor assembly according to claim 21, wherein a gas/air chamber is delimited between the inner shield and outer shield and wherein the internal width of said chamber is at least 2 mm.*

*25. Visor according to claim 21, wherein said mechanical fixing elements comprise a snap-fit rim for fixing the inner shield in the recess.*

*26. Visor assembly according to claim 25 wherein said spacer is a flexible seal.*

*27. Visor assembly according to claim 21, wherein said spacer is made of silicone material.*

*28. Visor assembly according to claim 21, wherein said inner shield is made of heat-treated cellulose acetate material.*

*29. Visor assembly according to claim 21, wherein said inner shield is made of cellulose propionate material.*

*30. Visor assembly according to claim 29, wherein said inner shield is provided on one side with a coating that counteracts misting up.*

*31. Visor assembly according to claim 30, wherein said inner shield is provided on one side with a coating which improves scratch resistance.*

*32. Visor assembly comprising:*

*a replaceable inner shield;*

*an outer shield spaced from the inner shield and comprising mechanical fixing elements to fix the inner shield to the outer shield, the inner shield being supported by the outer shield, being located within the periphery of the outer shield, being spaced from and engageable with the outer shield and being detachable from the outer shield and visor assembly;*

*a seat in said outer shield which at least partially corresponds to the shape of said inner shield and is associated with the mechanical fixing elements such that the inner shield can be fixed in the seat;*

*additional fixing elements for fixing the outer shield to a support component,*

*a spacing member adhered to and extending around the periphery of said inner shield, on a surface facing the outer shield, to space the inner shield from the outer shield; and a sealed gas/air chamber between the inner shield and the outer shield.*

*33. Visor assembly according to claim 32, wherein the mechanical fixing elements associated with the seat comprise a snap-fit rim.*

*34. Visor assembly according to claim 32, wherein the spacer acts as a sealing member to provide the sealed gas/air chamber between the inner shield and the outer shield.*

*35. Visor assembly according to claim 32, wherein said spacer is made of silicone material.*

*36. Visor assembly according to claim 34, wherein said spacer is a rubbery elastic material.*

*37. Visor assembly according to claim 32, wherein said inner shield is made of heat-treated cellulose acetate material.*

*38. Visor assembly according to claim 32, wherein said inner shield is made of cellulose propionate material.*

*39. Visor assembly according to claim 38, wherein said inner shield is provided on one side with a coating that counteracts misting up.*

*40. Visor assembly according to claim 38, wherein said inner shield is provided on one side with a coating which improves scratch resistance.*

*41. Visor assembly comprising:*

*an outer shield;*

*a replaceable inner shield spaced from the outer shield and located within the periphery of the outer shield;*

*mechanical fixing elements in the form of pins fitted on the outer shield and recesses in the inner shield, the pins being cooperative with the recesses to fix detachably the inner shield to the outer shield;*

*elements for fixing the outer shield to a further component,*

*a spacer extending around the periphery of said inner shield, said spacer being adhered to the inner shield and fitted detachably against said outer shield;*

*wherein the inner shield is detachable from the outer shield and visor assembly; and a sealed gas/air chamber between the inner shield and the outer shield.*

*42. Visor assembly according to claim 41, wherein the spacer acts as a sealing member to provide the sealed gas/air chamber between the inner shield and the outer shield.*

*43. Visor assembly according to claim 41, wherein a gas/air chamber is delimited between the inner shield and outer shield and wherein the internal width of said chamber is at least 2 mm.*

*44. Visor assembly according to claim 41, wherein said spacer is made of silicone material.*

*45. Visor assembly according to claim 41, wherein said pins are eccentric pins.*

*46. Visor assembly according to claim 41, wherein the visor assembly lacks electric heating means.*

*47. Visor assembly according to claim 41, wherein said inner shield is made of heat-treated cellulose acetate material.*

*48. Visor assembly according to claim 41, wherein said inner shield is made of cellulose propionate material.*

*49. Visor assembly according to claim 48, wherein said inner shield is provided on one side with a coating that counteracts misting up.*

*50. Visor assembly according to claim 48, wherein said inner shield is provided on one side with a coating which improves scratch resistance.*

*51. Visor assembly comprising:*

*a replaceable inner shield;*

*an outer shield spaced from the inner shield and comprising mechanical fixing elements in the form of pins fitted on the outer shield that interact with recesses in the inner shield to fix the inner shield to the outer shield, the inner shield being supported by the outer shield, being located within the periphery of the outer shield, being spaced from and engageable with the outer shield and being detachable from the outer shield and visor assembly;*

*additional fixing elements for fixing the outer shield to a support component; and*

*a spacing member stuck to and extending around the periphery of said inner shield, on a surface facing the outer shield, to space the inner shield from the outer shield; and*

*a sealed gas/air chamber between the inner shield and the outer shield.*

*52. Visor assembly according to claim 51, wherein the spacer acts as a sealing member to provide the sealed gas/air chamber between the inner shield and the outer shield.*

*53. Visor assembly according to claim 51, wherein a gas/air chamber is delimited between the inner shield and outer shield and wherein the internal width of said chamber is at least 2 mm.*

*54. Visor assembly according to claim 51, wherein said spacer is made of silicone material.*

*55. Visor assembly according to claim 51, wherein said pins are eccentric pins.*

*56. Visor assembly according to claim 51, wherein the visor assembly lacks electric heating means.*

*57. Visor assembly according to claim 51, wherein said inner shield is made of heat-treated cellulose acetate material.*

*58. Visor assembly according to claim 51, wherein said inner shield is made of cellulose propionate material.*

*59. Visor assembly according to claim 58, wherein said inner shield is provided on one side with a coating that counteracts misting up.*

*60. Visor assembly according to claim 58, wherein said inner shield is provided on one side with a coating which improves scratch resistance.*

* * * * *